Dec. 11, 1962 D. E. ALTMAN 3,068,407
APPARATUS FOR THE RAPID MEASUREMENT OF SLIGHT FREQUENCY
DIFFERENCES OR PHASE ANGLES BETWEEN TWO SIGNALS
Filed July 6, 1960 3 Sheets-Sheet 1

INVENTOR.
DANIEL E. ALTMAN

BY

ATTORNEYS

INVENTOR.
DANIEL E. ALTMAN
BY
ATTORNEYS

INVENTOR.
DANIEL E. ALTMAN

BY

ATTORNEYS 3,068,407
Patented Dec. 11, 1962

3,068,407
APPARATUS FOR THE RAPID MEASUREMENT OF SLIGHT FREQUENCY DIFFERENCES OR PHASE ANGLES BETWEEN TWO SIGNALS
Daniel E. Altman, 3641 Texas St., San Diego 4, Calif.
Filed July 6, 1960, Ser. No. 41,215
10 Claims. (Cl. 324—82)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus for the rapid measurement of slight frequency differences or phase angles between two signals and more particularly to an apparatus for the rapid measurement of slight frequency differences or phase angles between two signals in which the signals of interest are converted into triangular waveforms and compared in amplitude and slope.

One prior art method of measuring frequency differences merely measures each frequency individually with sufficient accuracy to obtain a significant measure of the difference frequency, but as the difference frequency becomes smaller, or, as the number of periods included in the frequency measurement becomes less, this prior art method soon fails to give a significant measure of the difference frequency. Another frequency measuring technique, the heterodyne method, also fails because it requires at least a pair of zero axis crossings of the difference frequency before the period of the difference frequency can be determined. Obviously, when the two signals of interest exist only for a short time, compared to a half period of their difference frequency, the prior art techniques are inadequate. The same difficulties arise regarding signals existing for extremely short times when an attempt is made to measure the phase angle between two signals of the same frequency.

It is thus an object of the present invention to provide apparatus for the rapid measurement of slight frequency differences between two signals when the signals of interest exist for less than a full cycle of the difference frequency.

A further object of the present invention is to provide apparatus for the rapid measurement of phase angles between two signals where the signals exist for an extremely short time period.

A further object of the present invention is to provide apparatus for the rapid measurement of slight frequency differences between two signals where the relative amplitudes of the two signals have no effect on the ultimate measurement accuracy.

Yet another object of the present invention is to provide apparatus for the rapid measurement of slight frequency differences between two signals in which calibration requires a minimum of time and operating skill.

According to the invention, the signals to be compared are amplified above a predetermined level. The first signal is passed through a phase splitter and each phase is clipped both positively and negatively. The second signal is passed directly into an amplitude clipper after amplification which also clips this signal positively and negatively. The outputs, then, of the three clippers, i.e. the two phases of the first signal and the second signal, which at this point approximate square waves, are each passed through a separate integrator resulting in a substantially triangular waveform i.e., linear rise and decay. The two anti-phase signals from the first signal are added separately to the second signal after integration and each sum is amplified in a separate amplifier. At this point, by proper adjustment of the amplifier gains, a null meter applied across the two amplifier outputs can be employed to indicate equal amplitudes. The outputs of the two amplifiers are then each passed through an envelope detector, differentiated, and applied through unidirectional coupling means to an amplitude responsive instrument. The proof and theory of how these operations result in the reading on the amplitude responsive means being directly proportional to the frequency difference between the two signals and obtaining a reading in an extremely short time, will be understood with reference to the detailed description to follow. It is further pointed out that if the output of either amplitude detector were further filtered and metered the reading would be directly proportional to the phase difference between the two input signals if the frequencies are equal.

Other objects and many of the attendant advantages of the present invention will be readily apparent from the following detailed description taken in conjunction with the drawings in which.

Figure 1:
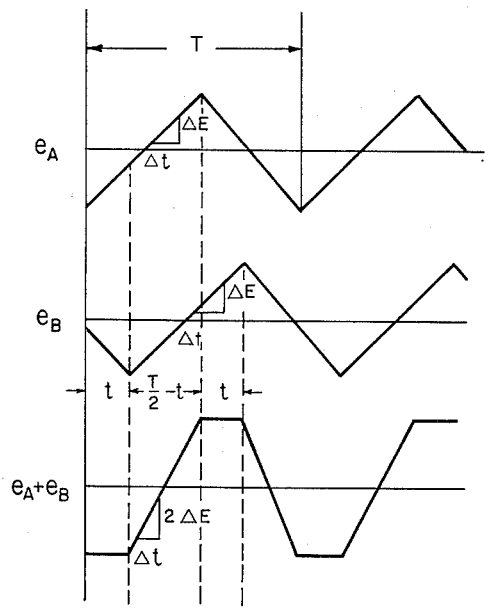
FIG. 1 is an illustration of the addition of two triangular waveforms displaced in phase.

Referring to FIG. 1, there is shown at $e_a$ a triangular waveform of one particular phase and at $e_b$ a triangular waveform identical to $e_a$ but displaced in phase relationship. The third waveform is $e_a$ plus $e_b$ i.e., the summation of the first two.

Figure 2:
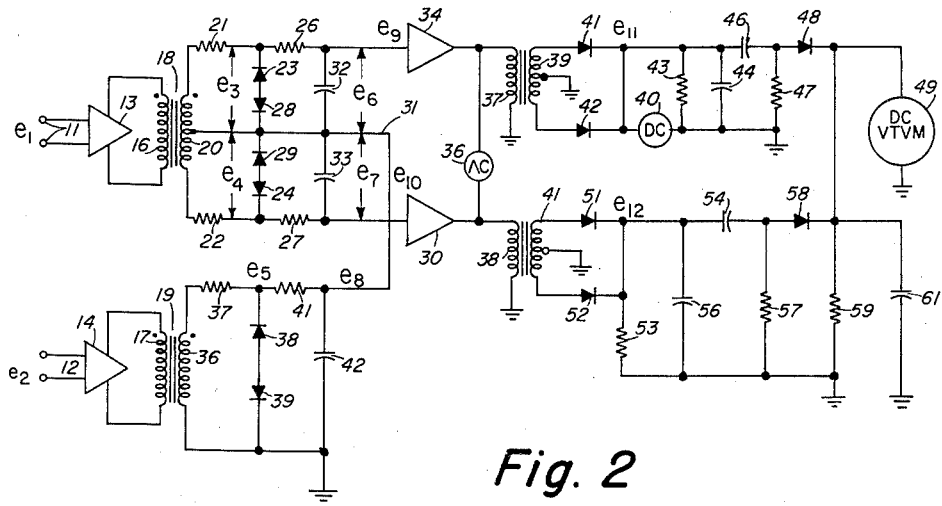
FIG. 2 is a schematic representation of a preferred embodiment of the present invention.

In FIG. 2 there is shown input terminals 11 and 12 connected to amplifiers 13 and 14 to primary windings 16 and 17 or transformers 18 and 19. Secondary winding 20 of transformer 18 is connected through resistors 21 and 22 to zener diodes 23 and 24 and resistors 26 and 27. Zener diodes 23 and 24 are connected through zener diodes 28 and 29 to bus 31 which is the center tap of secondary winding 20. Bus 31 is connected through capacitors 32 and 33 back to the other side of resistors 26 and 27, and to the input of amplifier 34. Secondary winding 36 of transformer 19 is connected between ground and resistance 37, the other side of which is connected through zener diodes 38 and 39 to ground and through resistance 41 to bus 31. Bus 31 is also connected through capacitor 42 to ground. Null meter 36 is connected across the outputs of amplifiers 34 and 30. The outputs of amplifiers 34 and 30 are also connected through primaries 37 and 38, respectively to ground. Secondary windings 39 and 41 of primary windings 37 and 38, respectively, have center taps connected to ground. Secondary winding 39 is coupled through diodes 41 and 42 to one side of resistor 43 and capacitors 44 and 46. The other sides of resistor 43 and capacitor 44 are connected to ground, and the other side of capacitor 46 is connected through resistance 47 to ground and through diode 48 to vacuum tube volt meter 49, the other side of which is connected to ground. Secondary winding 41 is connected through diodes 51 and 52 to one side of resistor 53 and capacitors 54 and 56. The other sides of resistor 53 and capacitor 56 are connected to ground, and the other side of capacitor 54 is connected through resistance 57 to ground and through diode 58 to the ungrounded side of vacuum tube volt meter 49, and through resistance 59 and capacitance 61 to ground.

Figure 3:
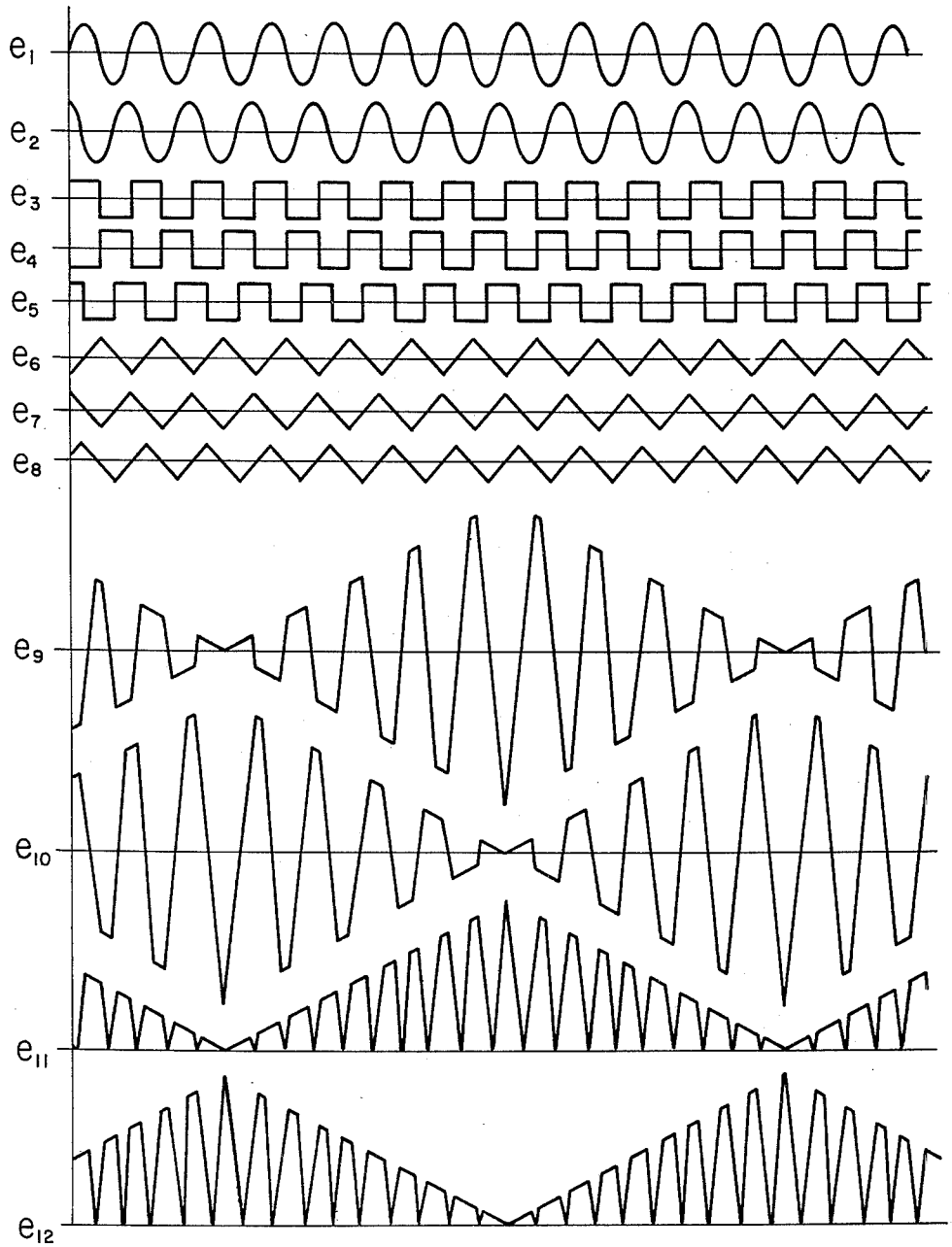
FIG. 3 is a graphic representation of typical waveforms found throughout the circuit of FIG. 2.

Referring to FIG. 3, the input waveforms at terminals 11 and 12 are shown as typical sine waves $e_1$ and $e_2$. The remainder of the waveforms shown, $e_3$ to $e_{12}$, represent the voltage waveforms as indicated in FIG. 2 resulting from the application of signal waveforms $e_1$ and $e_2$. These will be explained with reference to the operation of FIG. 2.

Figure 4:
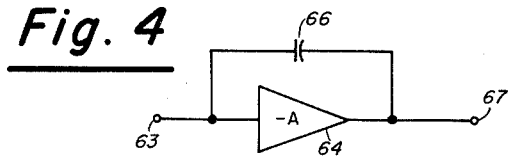
FIG. 4 is a schematic representation of an alternate method of integration.

Referring to FIG. 4, there is shown input terminal 63 connected to amplifier 64 with feedback capacitance 66 connected between input terminal 63 and output terminal 67.

Figure 5:
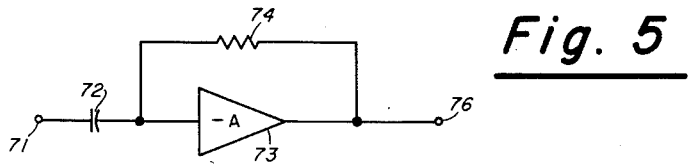
FIG. 5 is a schematic representation of an alternate method of differentiation.

Referring to FIG. 5, input terminal 71 is connected through capacitor 72 to amplifier 73 and to one side of resistance 74. Output terminal 76 is connected to the other side of resistance 74.

*Operation of Frequency Difference Indicator*

Referring back to FIG. 1, if two signals $e_a$ and $e_b$ of triangular form as shown have the same amplitude and the same period, i.e. frequency, but reach their peak values at times differing by T seconds, the effect is described as being a phase difference of $$\frac{2\pi t}{T}$$

radians. Since the instantaneous voltage of each signal increases from zero to maximum in one quarter period, the slope of the sides of the triangular waveform is $$\frac{E_{max}}{T/4}$$

or $$\frac{4E_{max}}{T}$$

volts per second. If during some time interval, $\Delta t$ seconds, each signal increases by $\Delta E$ volts, the sum of the two signals will increase by $2\Delta E$ volts, so that the slope of the sum of the two signals when they are both changing in the same direction is twice the slope of either waveform or $$\frac{8E_{max}}{T}$$

When $e_b$ reaches its peak value $t$ seconds later than $e_a$, the two voltages change in opposite directions during the time interval between the two peaks so that the sum voltage remains constant during this interval. This is true for both positive and negative peaks. Thus the time during which the sum voltage rises is one half period minus $t$ or $T/2-t$. The peak-to-peak voltage that the sum of $e_a$ and $e_b$ reaches is then this time of rise multiplied by the slope or $$\frac{8E_{max}}{T}(T/2-t)$$

from which the peak voltage is $$E_p = 2E_{max}\left(1 - 2\frac{t}{T}\right)$$

If $\theta$ is the phase difference between $e_a$ and $e_b$ in radians, $$\frac{t}{T} \text{ equals } \frac{\theta}{2\pi}$$

and $$E_p = 2E_{max}\left(1 - \frac{\theta}{\pi}\right)$$

Thus, when $\theta$ is between zero and $\pi$, $E_p$ decreases linearly with $\theta$ and when $\theta$ is between $\pi$ and $2\pi$, $E_p$ increases linearly with $\theta$.

The peak value of the sum of the two triangular voltages $e_a$ and $e_b$ is then a linear measure of the phase difference between $e_a$ and $e_b$. This phenomenon is the theory behind the phase measuring feature, and, in conjunction with further operations, is utilized in the frequency difference measuring feature of the instant invention.

Referring now to FIG. 2, one input voltage $e_1$ as indicated is coupled to input terminals 11 and the second input signal $e_2$ as indicated is applied to input terminal 12. Each signal is amplified in amplifiers 13 and 14, respectively, and applied to primaries 16 and 17 of transformers 18 and 19, respectively. Secondary winding 20 of transformer 18 is center tapped and utilized as a phase splitter for input signal $e_1$. Resistors 21 and 22 then couple both phases, which are now referenced to center tap 31, to the zener diode network 23, 28, 29 and 24. As is well known in the art, zener diodes, when set up in a back to back relationship such as this, operate to clip or limit the signal on both the positive and negative cycles, resulting in this case in square waves due to the amplitude of the applied signals.

Referring to FIG. 3, input signals $e_1$ and $e_2$ are shown as sine curves displaced in frequency, and $e_3$ and $e_4$ are shown as square waves representing the split phases of $e_1$. Amplifier 13 insures that a high level signal is applied across the zener diode network so that the positive and negative clipping results substantially in the square waves shown as $e_3$ and $e_4$. The resistor-condenser combination consisting of resistor 26 and capacitor 32 and the resistor-condenser combination consisting of resistor 27 and capacitor 33 comprise integrating networks for each phase of $e_1$ resulting in the triangular waveforms $e_6$ and $e_7$. The square wave output from the zener diodes 38 and 39 represented as $e_5$ is coupled to the resistance-capacitance combination 41 and 42, which again integrates the signal resulting in a triangular waveform shown at $e_8$. Since $e_8$ is utilized as the reference for $e_6$ and $e_7$, and $e_6$ and $e_7$ are 180° out of phase they will effectively add and subtract as shown at $e_9$ and $e_{10}$, which are applied as inputs to amplifiers 34 and 30, respectively. $e_9$ and $e_{10}$ are amplified in amplifiers 34 and 30, the peak outputs of which are equal as determined by adjusting their relative gains. The output of amplifier 34 is coupled through primary winding 37 to center tapped secondary winding 39, and diodes 41 and 42 operate as a full wave detector. Resistor 43 and capacitor 44 result in envelope detection. D.C. meter 40 connected across resistor 43 is the phase indicator which will be explained below. Capacitor 46 and resistor 47 operate as a differentiating network which, when a rising linear slope is applied, results in a steady D.C. voltage drop across resistor 47 which is coupled through rectifier 48 to D.C. vacuum volt meter 49. The output from amplifier 30 is passed from primary 38 to center tapped secondary 41 and is full wave envelope detected and differentiated in exactly the same manner as the output of amplifier 34. Since rectifier 58 will only conduct when the slope is positive and the two signals at this point are 180° out of phase as shown by waveforms $e_9$, $e_{10}$, $e_{11}$ and $e_{12}$ of FIG. 3 the D.C. vacuum tube volt meter will show a steady D.C. reading dependent upon the frequency difference between signals $e_1$ and $e_2$. Capacitor 61 is placed across the output so that when the signals appearing at the output switch i.e., due to the unidirectional coupling of rectifiers 48 and 58 only one signal will be applied to the D.C. VTVM 49 at a time, any transient will be eliminated and the starting over of the build up of current through resistors 47 and 57 will likewise be eliminated.

Going back to the inputs, if the two signal frequencies $e_1$ and $e_2$ are of a slightly different frequency as illustrated in FIG. 3 it is seen with reference to the previous explanation that signals $e_9$ and $e_{10}$ are applied to the inputs of amplifiers 34 and 30, respectively. These amplifier waveforms will then be coupled through primaries 37 and 38, respectively, to secondaries 39 and 41, respectively. The sum of $e_6$ and $e_8$ will approach the flat topped waveform of $e_a$ plus $e_b$ of FIG. 1 when they are slightly out of phase, and when the inphase condition is approached will be merely the arithmetical sum of the two. This is again shown as $e_9$ in FIG. 3. The in phase condition then will be maximum amplitude and the exact out of phase condition will be the null points. Since $e_7$ is 180° out of phase with $e_6$ the summation of $e_7$ and $e_8$ will be identical to that of $e_6$ and $e_8$ with the exception that the null points and peak points will be reversed as shown in FIG. 3 at $e_{10}$. With reference to the description of the phase meter operation to follow, it is pointed out that this will always result in the flat topped triangular waveform shown in FIG. 1 as $e_a$ plus $e_b$ and when after undergoing full wave rectification will result in an average D.C. level the amplitude of which again will be dependent upon the phase angle. When two frequencies are close but are not identical they will constantly be going through the in phase and out of phase condition as shown by $e_9$ and $e_{10}$. After full wave detection the outputs of amplifiers 34 and 30 will appear as $e_{11}$ and $e_{12}$, also shown in FIG. 3. The effects of the envelope detection are not shown but are well known and conventional to the art. When $e_{11}$, for example, is applied to differentiator capacitor 46 and resistor 47 and the output of this differentiation is taken through unidirectional rectifier coupler 48 only the positive slope can appear through rectifier 48. Thus, with a continuing positive slope capacitor 46 is charged through resistance 47 with a steady charging current resulting in a steady positive D.C. voltage on the input side of rectifier 48. The negative slope will not appear on the output since it cannot be passed through rectifier 48. The identical action takes place in capacitance 54 and resistance 57, the positive slope only being passed which will result in a steady D.C. positive voltage being applied to D.C. volt meter 49. This also eliminates any deleterious effect from capacitors 44 and 56 failing to follow the negative slopes completely. Since the maximum amplitude of waveforms $e_{11}$ and $e_{12}$ occur in the in phase condition, the maximum amplitudes are held constant through the effects of the zener diode amplitude clippers previously described. The difference frequency, however, will be reflected in the space between the null and maximum i.e., the in phase and out of phase condition, which will effect the slope of the envelope. The differential of this linear slope is a constant and will determine the positive D.C voltage applied to D.C. vacuum tube volt meter 49. The amplitude of this D.C. voltage will be a direct measure of, or directly proportional to, the frequency difference between $e_1$ and $e_2$. It is further pointed out that after switching outputs from rectifier 48 to rectifier 58, the amplitude would automatically drop back to zero since, even though the numerical value of the differential is higher than zero, the voltage applied to the differentiator capacitor 54 and resistor 57 must be numerically greater than the differential before this reading will be obtained. For this reason, capacitor 61 is applied across the output to hold D.C. vacuum tube volt meter 49 at this level during the switchover until the voltage build up has had a chance to cause a voltage drop through resistance 57 of the value of the differential.

In calibration, the same signal can be applied to input terminals 11 and 12 for a zero setting of D.C. vacuum tube volt meter 49 and the maximum frequency difference of interest can be applied for a maximum setting of D.C. vacuum tube volt meter 49.

*Operation as a Phase Indicator*

Should input signals $e_1$ and $e_2$ be of the same frequency and it is desired to know their phase relationship the reading of D.C. meter 40 will be directly proportional to the phase difference between them. This is easily shown with reference to FIG. 3 and the curves showing $e_8$ and $e_9$ which are applied to amplifiers 34 and 30, respectively. It is easily seen that input voltage $e_9$ which is the sum of voltages $e_6$ and $e_7$ will be zero if they are equal in frequency and opposite in phase. This is then defined as the in phase condition of $e_1$ and $e_2$. Conversely, if $e_1$ and $e_2$ are of opposite phase, $e_6$ and $e_8$ will be in an in phase condition resulting in their direct addition and a maximum reading at D.C. meter 40. For calibration two signals of opposite phase can be supplied at input terminals 11 and 12, respectively, and the gain of amplifier 34 can be adjusted for the full scale out of phase condition.

Referring now to FIG. 4, there is shown a typical electronic integration circuit which, obviously, can be substituted for any of the resistance-capacitance integration circuits of FIG. 2. This is illustrated merely to point out that the invention is not limited to the simple embodiment shown.

FIG. 5 likewise, shows an electronic negative feedback differentiator circuit which is conventional and well known to the art and, obviously, could be utilized in place of any of the simple resistance-capacitance differentiation networks of FIG. 2.

Figure 6:
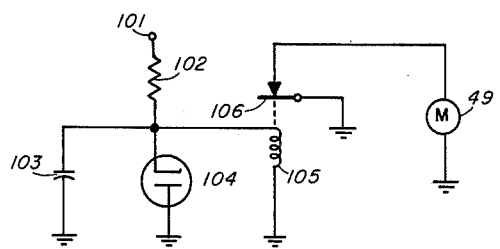
FIG. 6 is a schematic representation of a meter disabling feature which can be incorporated in the present invention.

Referring to FIG. 6, a further refinement of FIG. 2 is illustrated which is for the purpose of disabling the output indicator 49 during the first few cycles of signals $e_1$ and $e_2$. If a switch is thrown coupling inputs $e_1$ and $e_2$ into the circuit of FIG. 2, it is possible that a high transient would create an extremely large signal at the outputs of rectifiers 48 and 58 which could overload meter 49. This can be obviated by applying one of the input signals to terminal 101 of FIG. 6 which is rectified by diode 104 and, as determined by the time constant of resistance 102 and capacitance 103, will activate relay 105 which pulls contact 106 down and opens the short circuit of D.C. vacuum tube volt meter 49. Thus, during the first few cycles until capacitance 103 has a chance to charge through resistance 102, the output meter 49 is short circuited and this transient condition cannot result in an overload. This is just one method of accomplishing this protective feature. Obviously, threshold devices could be placed across D.C. vacuum tube volt meter 49 to accomplish the same purpose.

Obviously many modifications and variations of the present invention are possible in the light of the above teachings. It is therefore to be understood that within the scope of the appended claims the invention may be practiced otherwise than as specifically described.

What is claimed is:

1. Apparatus for the measurement of small frequency differences between two signals comprising first and second signal input terminals adapted to be connected to first and second signals, phase splitting means connected to said first input terminals for splitting any signal applied thereto into first and second phases 180 degrees apart, said phase splitting means having first and second phase signal output terminals, first, second and third amplitude clipping means for clipping said first and second phase signals and said second signal, said first, second and third amplitude clipping means connected to said first and second phase signal output terminals and said second input terminals, respectively, first, second and third integrating means connected to the outputs of said first, second and third amplitude clipping means, respectively, first and second summing means for summing said first phase signal and said second signal and summing said second phase signal and said second signal, said first summing means connected to the outputs of said first and third integrating means and said second summing means connected to the outputs of said second and third integrating means, amplitude balancing means connected to the output of at least one of said summing means for balancing the amplitudes of the outputs of said first and second summing means, first and second envelope detecting means connected to the outputs of said first and second summing means, respectively, first and second differentiating means connected to the outputs of said first and second envelope detecting means, respectively, first and second unidirectional coupling means connected to the outputs of said first and second differentiating means, respectively, amplitude responsive means, and connecting means for connecting said amplitude responsive means to the outputs of said first and second clamping means.

2. The apparatus of claim 1 wherein said amplitude clipping means comprise zener diodes connected in a back to back relationship.

3. The apparatus of claim 2 wherein said balancing means comprises a pair of amplifiers, at least one of said amplifiers having an adjustable gain.

4. The apparatus of claim 3 wherein said envelope detecting means comprise full wave detectors.

5. The apparatus of claim 1 wherein said connecting means comprises disabling means connected to at least one of said input terminals, said disabling means operable to connect said amplitude responsive means to the outputs of said first and second clamping means a predetermined time after an input signal is applied to said connecting means.

6. Apparatus for the measurement of phase differences between two signals comprising first and second signal input terminals adapted to be connected to first and second signals, first and second amplitude clipping means connected to said first and second input terminals operatively receiving said first and second signals for clipping said first and second signals and generating a substantially square waveform, respectively, first and second integrating means connected to the outputs of said first and second amplitude clipping means, respectively for generating a waveform having a linear rise and decay, summing means connected to the outputs of said first and second integrating means for summing the outputs of said first and second integrating means, envelope detecting means connected to the output of said summing means for generating a waveform corresponding to the envelope of the output of the summing means, and amplitude responsive means connected to the output of said detecting means for measuring the phase angle between the input signals.

7. The apparatus of claim 6 wherein said amplitude clipping means comprise zener diodes connected in a back to back relationship.

8. The apparatus of claim 7 wherein said envelope detecting means comprises a full wave detector.

9. Apparatus for the measurement of small frequency differences and phase differences between two signals comprising first and second signal input terminals adapted to be connected to first and second signals, phase splitting means connected to said first input terminals for splitting any signal applied thereto into first and second phases 180 degrees apart, said phase splitting means having first and second phase signal output terminals, first, second and third amplitude clipping means for clipping said first and second phase signals and said second signal, said first, second and third amplitude clipping means connected to said first and second phase signal output terminals and said second input terminals, respectively, first, second and third integrating means connected to the outputs of said first, second, and third amplitude clipping means, respectively, first and second summing means for summing said first phase signal and said second signal and summing said second phase signal and said second signal, said first summing means connected to the outputs of said first and third integrating means and said second summing means connected to the outputs of said second and third integrating means, amplitude balancing means connected to the output of at least one of said summing means for balancing the amplitudes of the outputs of said first and second summing means, first and second envelope detecting means connected to the outputs of said first and second summing means, respectively, first amplitude responsive means connected to the output of said first envelope detecting means for indicating any phase difference between said first and second signals, first and second differentiating means connected to the outputs of said first and second envelope detecting means, respectively, first and second unidirectional coupling means connected to the outputs of said first and second differentiating means, respectively, and amplitude responsive means connected to the outputs of said first and second unidirectional coupling means.

10. Apparatus as set forth in claim 9 for the measurement of small frequency differences and phase differences between two signals wherein said amplitude responsive means comprises means for measuring the frequency difference between said input signals.

References Cited in the file of this patent

UNITED STATES PATENTS

| 2,522,976 | Williams | Sept. 19, 1950 |
| 2,535,255 | Barnes et al. | Dec. 26, 1950 |
| 2,725,528 | Werner | Nov. 29, 1955 |
| 2,860,306 | Towner | Nov. 11, 1958 |
| 2,928,047 | Littlefield et al. | Mar. 8, 1960 |
| 2,930,892 | Palmer | Mar. 29, 1960 |

OTHER REFERENCES

An Electronic Phasemeter, article in Proceedings of the I.R.E., Waves & Electronics Section, February 1949, pages 207–210.